May 23, 1939.  P. H. SMYTH, JR  2,159,832

PHONOGRAPH

Filed July 19, 1934  6 Sheets-Sheet 1

Inventor:
Paul H. Smyth Jr.
By
Williams, Bradbury, McCabe & Hinkle
Attys.

May 23, 1939.  P. H. SMYTH, JR  2,159,832
PHONOGRAPH
Filed July 19, 1934  6 Sheets-Sheet 2
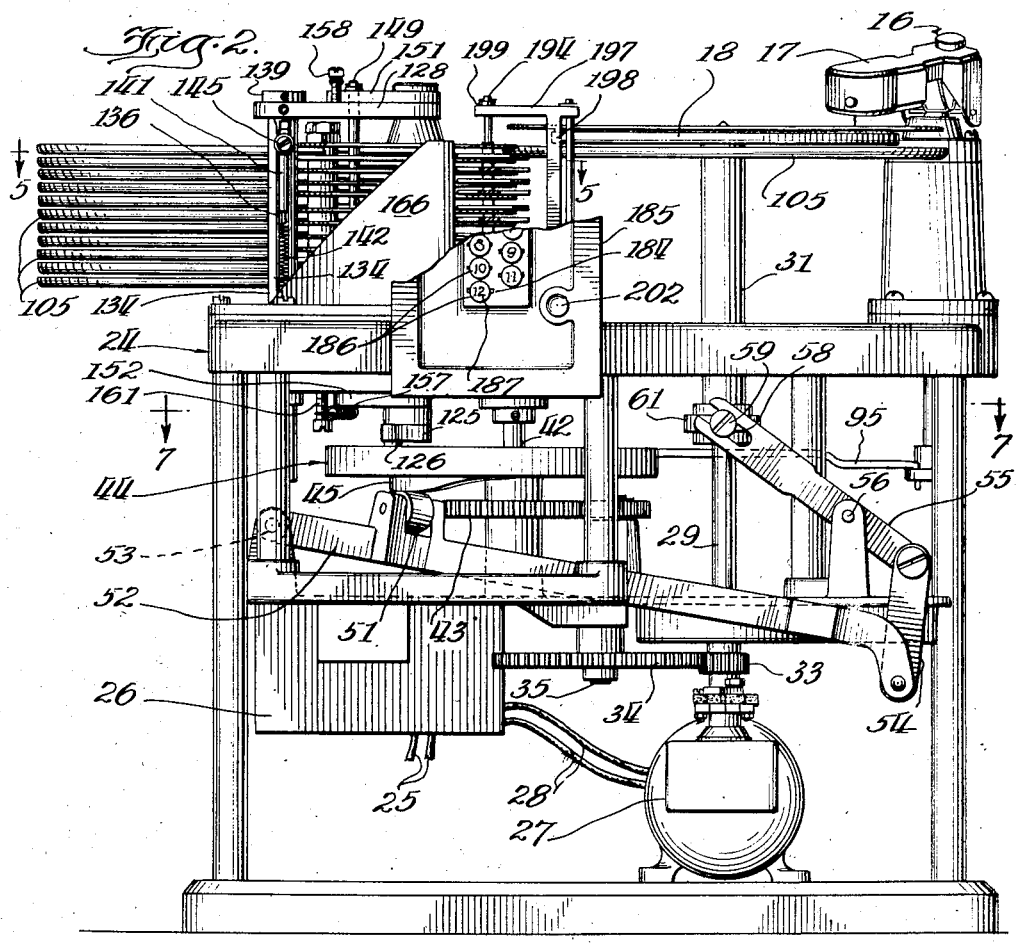
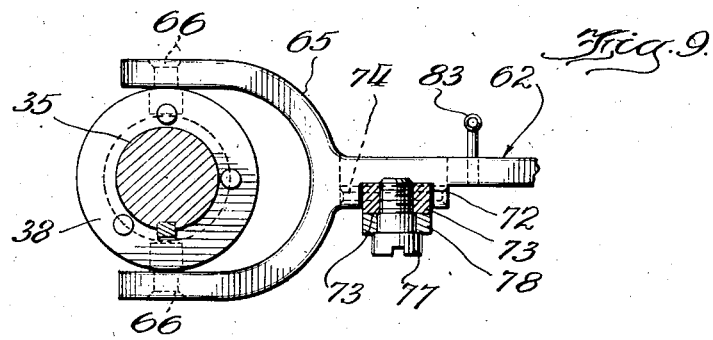
Inventor:
Paul H. Smyth Jr.
By Williams, Bradbury, McCaleb & Hinkle
Attys.

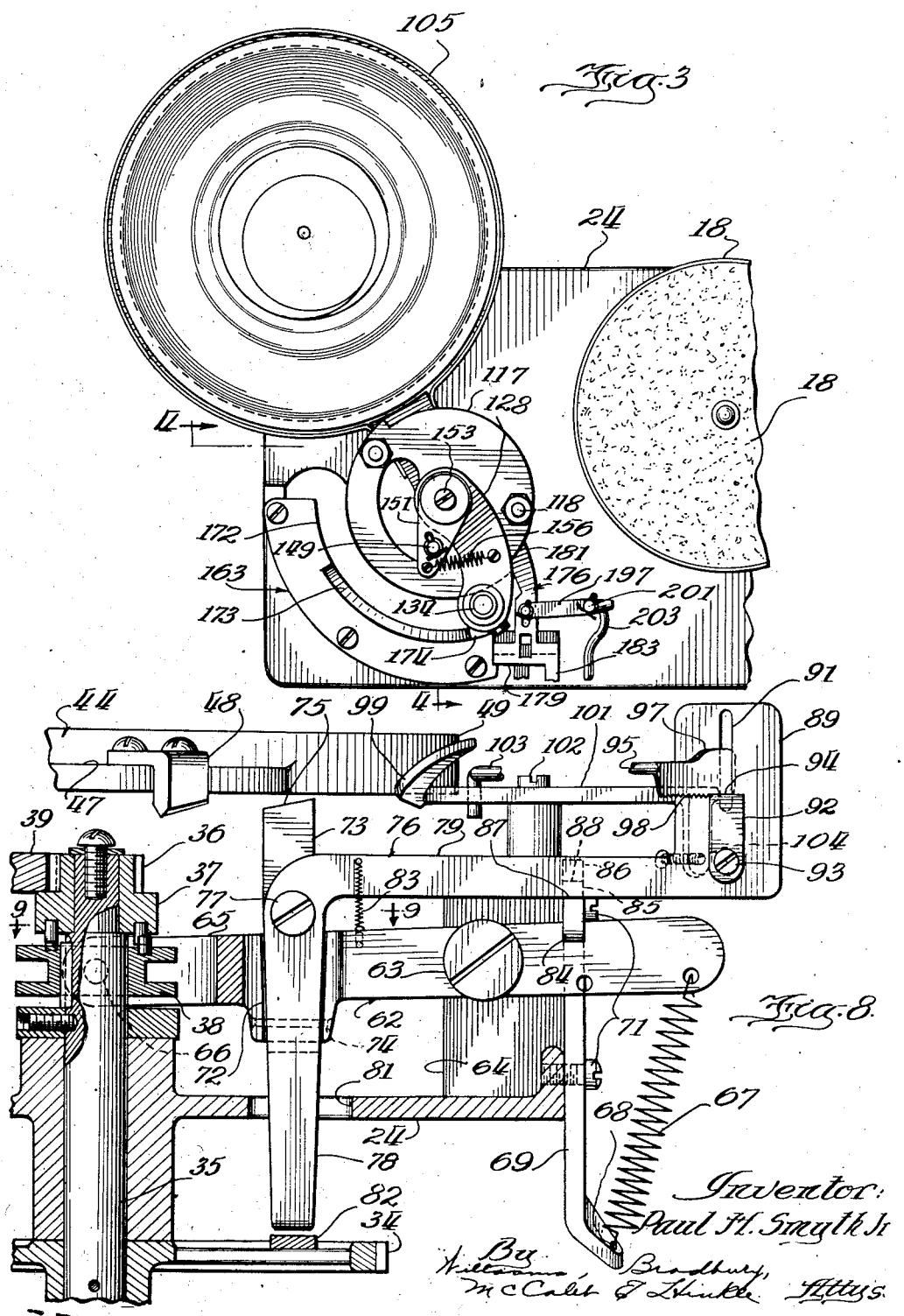

May 23, 1939.  P. H. SMYTH, JR  2,159,832
PHONOGRAPH
Filed July 19, 1934  6 Sheets-Sheet 4
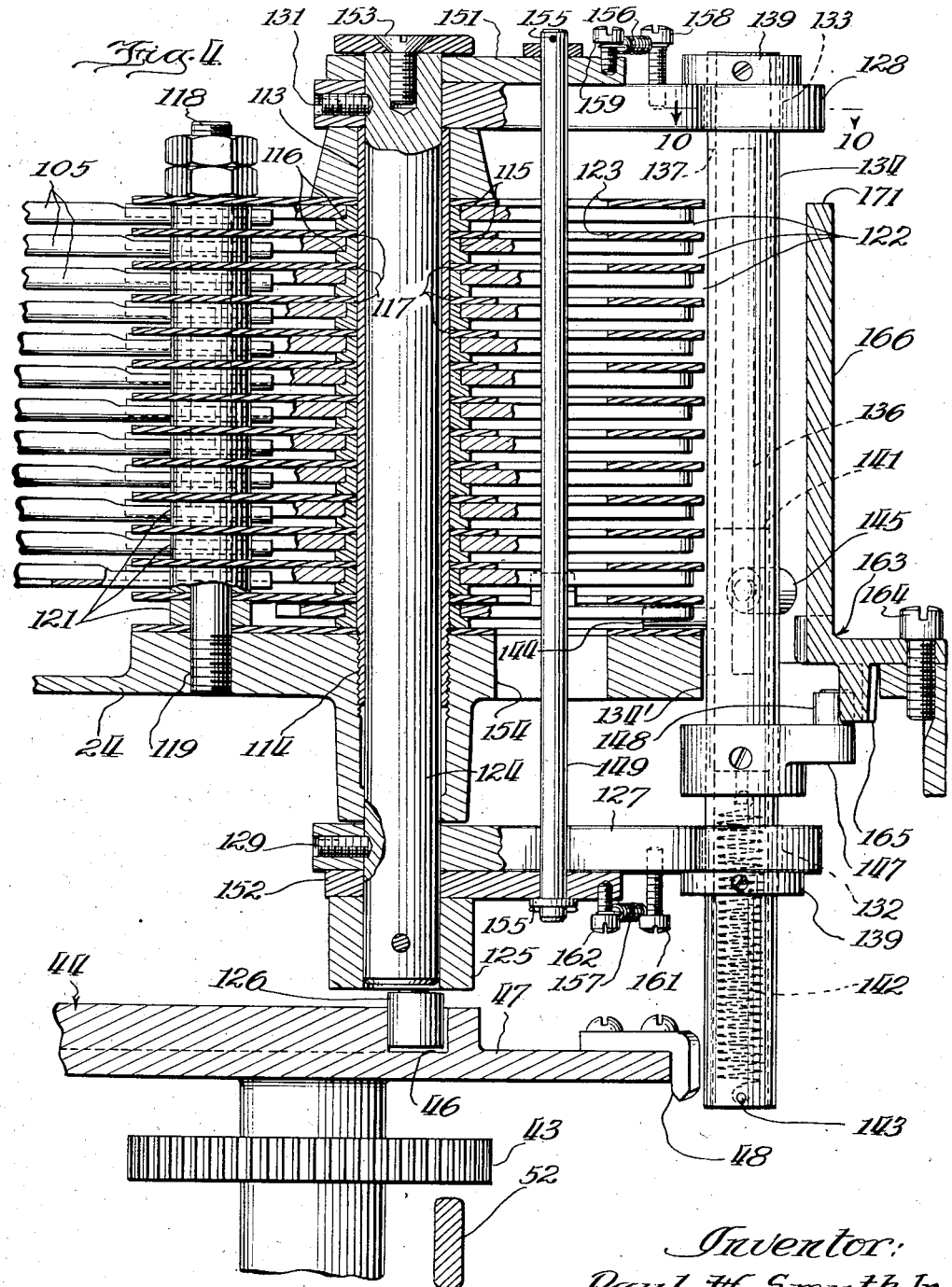
Inventor:
Paul H. Smyth Jr.
By Williams, Bradbury, McCaleb & Hinkle
Attys.

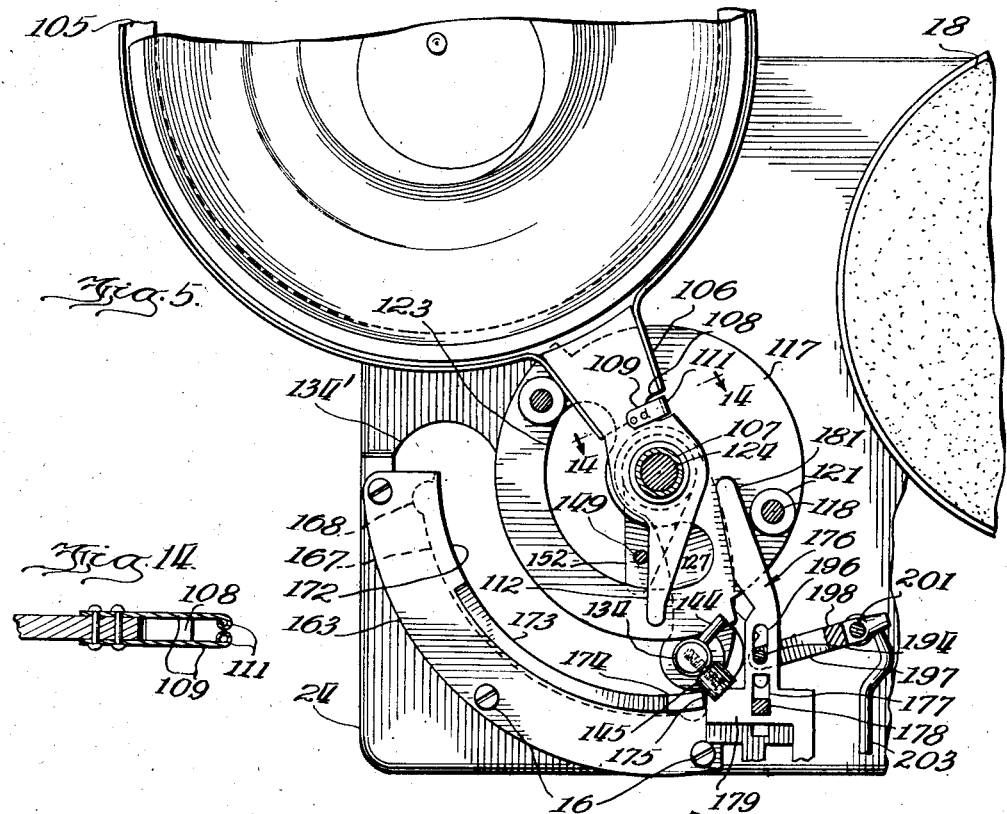
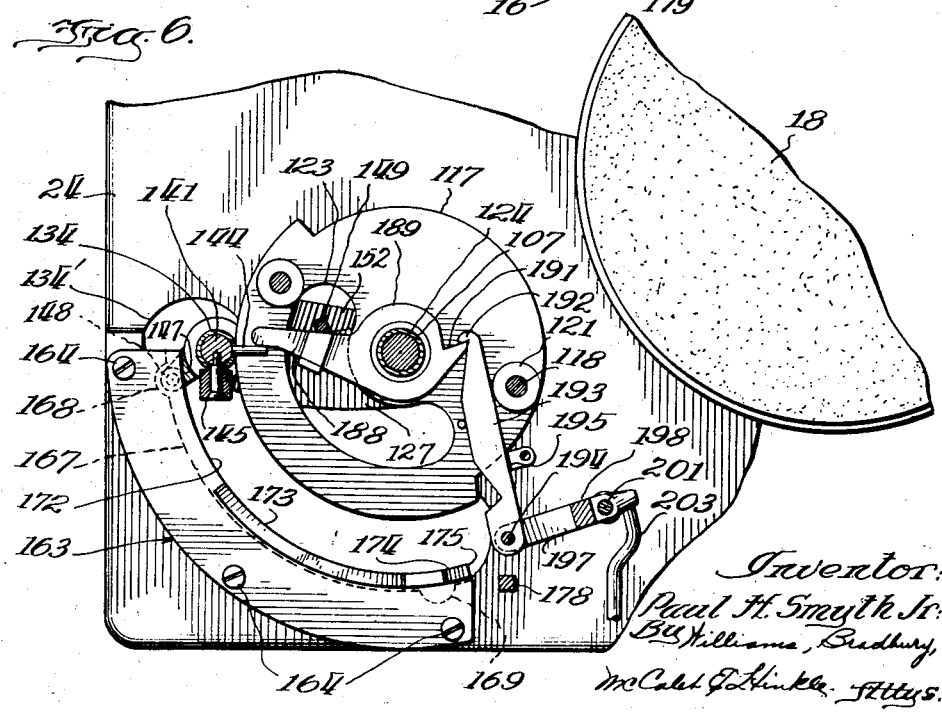

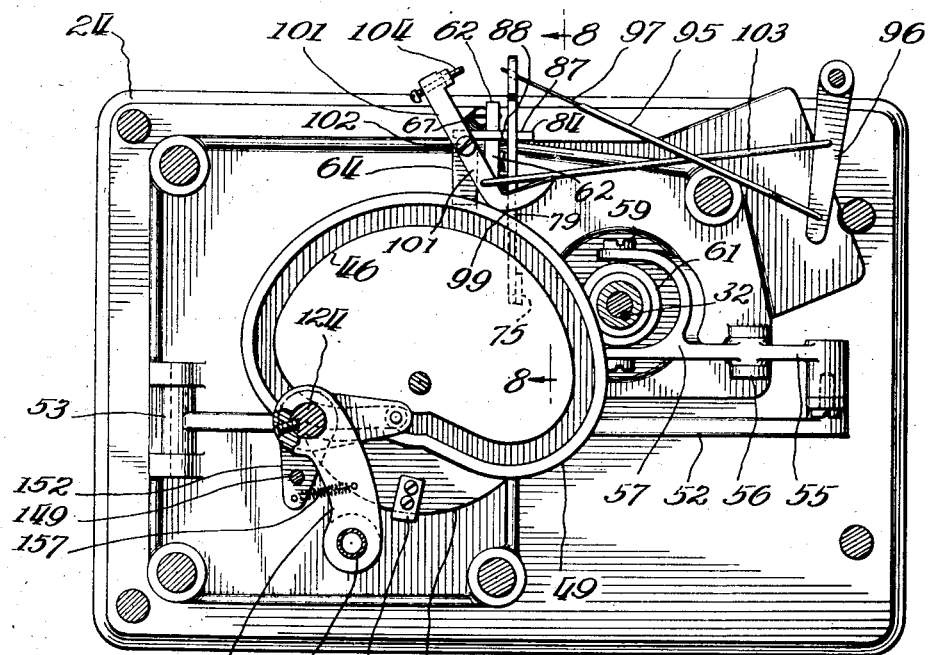
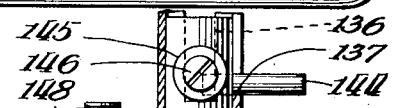
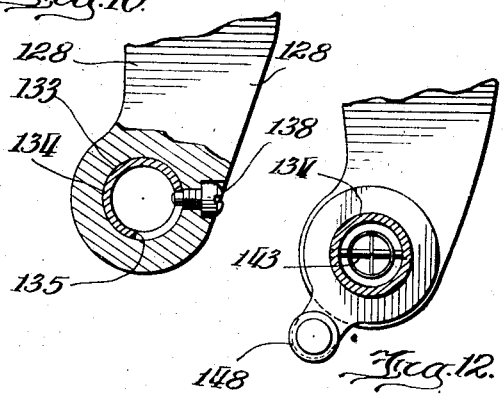

Patented May 23, 1939

2,159,832

UNITED STATES PATENT OFFICE 2,159,832

PHONOGRAPH

Paul H. Smyth, Jr., Evanston, Ill., assignor to Rock-Ola Manufacturing Corporation, Chicago, Ill., a corporation of Delaware Application July 19, 1934, Serial No. 735,936

45 Claims. (Cl. 274—10)

This invention relates to phonographs, and has more particular reference to a selecting phonograph wherein any one or more records may be selected from a plurality of records, either in advance of playing any record, or while playing any record. The selected record or records are thereafter delivered one at a time to a playing position for reproduction.

For so much of the subject matter disclosed herein which is also disclosed in my copending United States Letters Patent application, Serial No. 568,610, filed October 8, 1931, I claim the priority of that previously filed application. My above identified application has resulted in United States Letters Patent No. 2,004,016 which has been reissued as Re. 20,818.

The mentioned previously filed application discloses a phonograph wherein a reciprocable turntable cooperated with a reproducer for playing one record at a time. The record or records to be played were arranged laterally adjacent the reciprocable turntable in record bearing or carrying members or trays which were independently reciprocable into and from the path of the turntable. When a record carrying tray moved into the path of the turntable, the record was taken therefrom and was presented for playing by the turntable. After playing, the turntable deposited the played record in its tray. A rotatable cam mechanism was employed to select the records, and that mechanism was operable by manual means to select the records or the trays carrying them for playing the records, either in orderly succession or rotation, or one at a time in any desired sequence. The selecting mechanism was also automatically operable to select all or a predetermined number of the records for playing them in orderly succession or rotation.

A general object of the present invention is to simplify the construction of such selecting phonographs as a whole.

A more specific object of the invention is the provision in such phonographs, of a novel and an improved selector mechanism.

Another object of the invention is the provision of such a selector mechanism which will permit the reselection of a record while it is being played, whereby the record may be repeated or played again.

A further object of the invention is the provision of a common driving means for rotating and reciprocating the turntable, returning a played record to its position laterally adjacent the path of the turntable, returning the reproducer or playing arm to a starting position, driving the selector, and swinging or moving the selected records into the path of the turntable, whereby such records may be played, as will be described hereinafter.

Other objects of the invention will be apparent from the following description, and from the accompanying drawings, in which similar characters of reference indicate similar parts throughout the several views.

Referring to the drawings;

Fig. 2 is an elevation of the record carrying selecting, playing, and changing assembly, broken away in part to bring out certain construction details;

Fig. 3 is a fragmentary plan view of the assembly shown in Fig. 2;

Fig. 4 is an enlarged fragmentary sectional view taken substantially along the lines 4—4 of Fig. 3;

Fig. 5 is a partial cross section taken substantially along the lines 5—5 of Fig. 2, but with the turntable in its lowered position;

Fig. 6 is a view similar to Fig. 5, with all of the record carriers removed;

Fig. 7 is a cross section taken substantially along the line 7—7 of Fig. 2;

Fig. 8 is an enlarged fragmentary cross section taken substantially along the lines 8—8 of Fig. 7;

Fig. 9 is a sectional detail taken substantially along the lines 9—9 of Fig. 8;

Fig. 10 is a fragmentary detail partially in cross section, along the lines 10—10 of Fig. 4;

Fig. 11 is a fragmentary sectional view showing certain construction and assembly details of the novel selector mechanism;

Fig. 12 is a sectional detail taken substantially along the lines 12—12 of Fig. 11;

Fig. 14 is a sectional detail along the lines 14—14 of Fig. 5.

Figure 1:
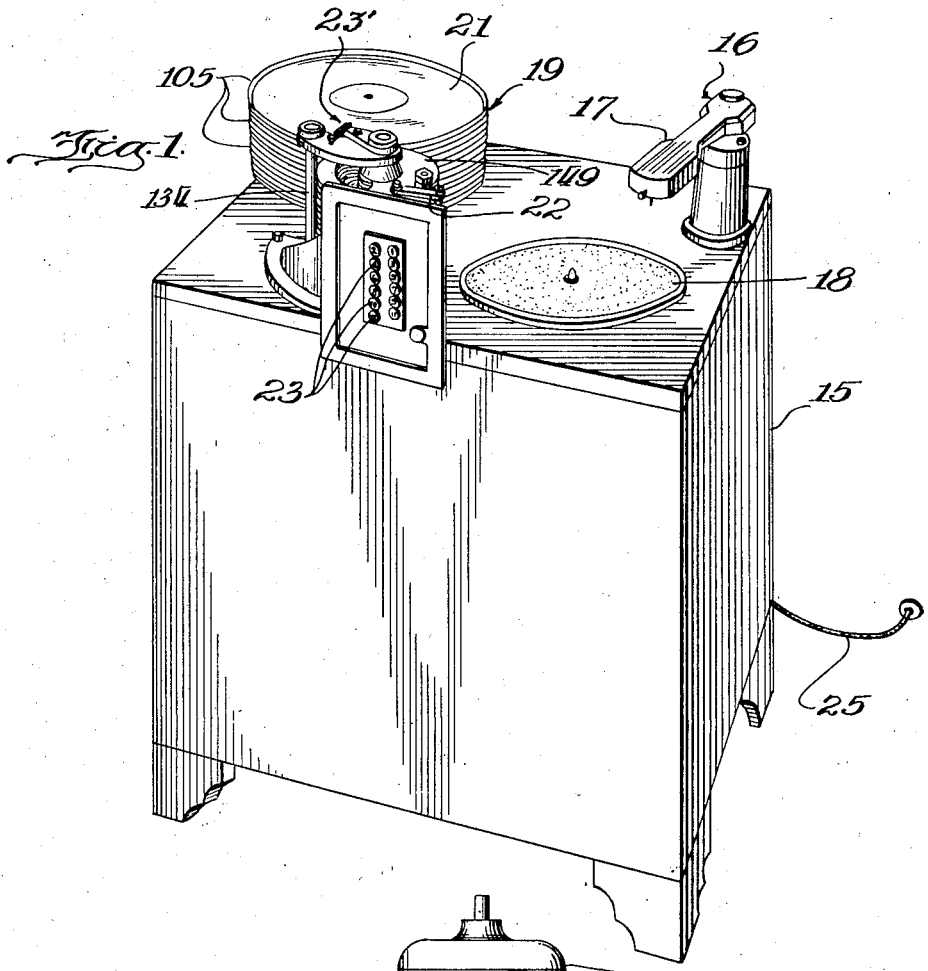
Fig. 1 is a perspective view of a phonograph embodying the features of the invention.
Figure 13:
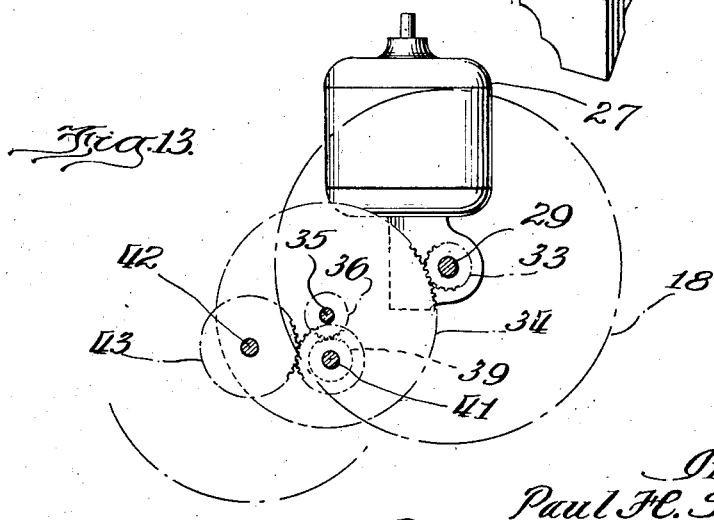
Fig. 13 is a schematic view showing the drive connections with the driving means.

Illustrative of the invention, Fig. 1 shows a phonograph provided with a suitable cabinet 15 and including reproducing means diagrammatically shown at 16 and associated with a playing arm 17, a turntable 18, record carrying means 19 adapted to carry a plurality of records 21, selecting means generally indicated by the reference character 22, selector operating means 20, and means generally designated 23' for operating the record carrying means 19, to deliver records to and to remove the same from the turntable. The foregoing apparatus is suitably mounted on or carried by a chassis or frame 24, as best shown in Fig. 2, and may be electrically operated as schematically indicated at 25.

It will be understood that a coin operated mechanism 26 may, as shown more particularly in Fig. 2, control suitable motor means 27 to which it is electrically connected by conductors 28 for driving a shaft 29 whereby to rotate the turntable 18 which is fixed at the upper end of a sleeve 31 telescoping about the shaft 29 and slidably keyed thereto as at 32 in order to permit reciprocation of the sleeve 31 and the turntable 18 carried thereby longitudinally of the shaft 29 while they are being rotated therewith.

The shaft 29 is provided with a drive pinion 33 which drivingly meshes with a gear 34 fixed on a shaft 35. A drive pinion 36 is adapted to rotate with a clutch member 37 so mounted on a reduced end portion of the shaft 35 that the shaft is rotatable relative to the pinion and clutch member. The clutch member 37, with a complementary clutch member 38 longitudinally slidable on and rotatable with the shaft 35, provides clutch means for driving the pinion 36 and an enmeshing gear 39 on a shaft 41 from the shaft 35. The shaft 41 is intermediate the shaft 35 and a shaft 42, the latter shaft being drivingly coupled to the shaft 35 through a gear 43 on the shaft 42.

Timing and actuating means for the turntable, reciprocating means, and the record changing means are driven from the shaft 42 and preferably take the form of a cam 44 fixed on and rotatable with the shaft. That cam 44 has a cam shoulder 45 projecting from one face thereof, a cam groove 46, and a cutaway portion 47 in its opposite face, the cutaway portion being provided with a cam finger 48 and a peripheral cam surface 49.

The cam shoulder 45 cooperates with a cam follower 51 on a lever or link 52 which is pivoted at one end thereof as at 53 to the chassis or frame 24, and which extends beyond the follower 51 to a pivotal connection with an arm or link 54. The other end of the arm or link 54 is pivotally connected to one end of a lever 55 having a fulcrum or pivot 56 on the frame 24 intermediate the ends of the lever, and having its other end bifurcated as at 57. Each furcation of the lever 55 is provided with a slot 58 slidably and pivotally accommodating the shanks of retaining screws 59 at opposite sides of a collar or enlarged end portion 61 on the sleeve 31. The cam shoulder is so designed that upon rotation of the cam 44 it will, in cooperation with the follower 51, operate the links 52, 54, and 55 to reciprocate the turntable between a position, for example, below the lower bounding plane of the record carrying means 19, and a position, for example, above the upper bounding plane of the record carrying means, i. e., between a non-playing position (Fig. 1) and a playing position (Fig. 2), respectively.

In order to drive the shaft 42 and the cam 44, suitable clutch operating means is provided for operating the clutch member 38, whereby the gear 36 may be driven with the shaft 35 which drives the gear 39 that in turn drivingly engages the gear 43. Such a means is shown in Figs. 7, 8, and 9. As therein illustrated, the clutch operating means comprises an arm or a lever 62 pivoted as at 63 intermediate its ends to a frame or chassis member 64 and having a bifurcated end 65 for attachment at opposite sides of the clutch member 38 by bolts or screws 66. The other end of the lever 62 is secured to one end of a spring 67 anchored as at 68 to an end of an arm or bracket 69, which is secured as at 71 to the frame 24 and the frame member 64. So arranged, the spring 67 acting through the pivoted lever 62 and the bolts 66 normally tends to urge the clutch member 38 into driving engagement with the clutch member 37 whereby to drive the gear 39 and through it, the gear 43 from the gear 36.

Intermediate the pivot or fulcrum 63 and the bifurcated end 65, the lever 62 has a slot or socket 72 for receiving an end of an arm 73 pivoted therein as at 74 to rock transversely of the lever, and having a cam surface 75 at its other end to cooperate with the cam finger 48. By such an arrangement, the lever 62 may be turned about its fulcrum 63 to cause the clutch member 38 to disengage the clutch member 37, whereby the gears 36, 39, and 43, and hence the cam 44, may be declutched from the shaft 35.

The arm 73 serves as mounting means for a bell crank lever 76 which is pivotally secured thereto by a bolt 77 and which has arms 78 and 79. The arm 78 is substantially parallel to and adjacent the arm 73 and extends beyond the pivoted end 74 thereof through an aperture 81 in the frame 24 to adjacent a lug 82 on the gear 34. The other arm 79 of the bell crank lever 76 is connected to the lever 62 by a spring 83 tending to hold the pivoted arm 73 in the slot or socket 72, or in other words, tending to prevent the attached arm 73 and the bell crank lever 76 from swinging about the pivot 74 in a direction outwardly of the slot or socket 72, and tending to swing the bell crank lever 76 in a clockwise direction as viewed in Fig. 8, about the pivot bolt 77.

Thus the bell crank lever 76 is capable of pivotal movement in two planes: one about the pivot 74 during which the lever moves with the arm 73, and the other about the pivotal bolt 77. The lug 82 is adapted to move the bell crank lever about the pivot bolt 77 in a counterclockwise direction, as viewed in Fig. 8, against the action of the spring 83 and the spring 83, as already mentioned, is adapted to return the arm 73 into the slot 72 and thereby to swing the arm and lever assembly about the pivot 74 in a direction toward the lever 62.

The arm 79 of the bell crank lever 76 extends outwardly from the pivot bolt 77 and engages on an arm 84 of the bracket 69. This arm 84 has two shoulders 85 and 86, providing two positions 87 and 88 for engagement by the arm 79. The action of the lug 82 on the arm 78 of the bell crank lever 76 serves to raise the arm 79 from the engagement position 87 to above the shoulder 85, and the spring 83 serves to urge the arm into the position 88 and against the shoulder 86. At that position the cam finger 48 acting against the cam surface 75 of the arm 73 has swung the lever 62 about the fulcrum 63 to declutch the drive pinion 36 and hence the cam 44 from driving relationship with the shaft 35.

For the purpose of operating the clutch to drive the pinion 36 and hence the cam 44, the arm 79 of the bell crank lever 76 extends beyond bracket arm 84 and is provided with an enlarged end 89 having an elongated aperture 91 therein, and a resilient member 92 secured thereto as at 93, whereby the resilient member provides an edge 94 intermediate the ends and transversely of the aperture 91.

The actuating member or arm 95 for operating the arm 79 is secured at one end to an arm 96 fixed on and swingable with the shaft of the playing arm 17, and has at its other end a flat portion 97 receivable in the aperture 91. The flat portion 97 of the arm 95 is serrated to provide teeth 98 engageable with the edge 94 and arranged to slide thereover when the arm 95 is moved inwardly of the aperture 91 and to swing the bell crank lever 76 against the action of the spring 83 outwardly from the sheet (Fig. 8) about the pivot 74 when the arm 95 is moved in the other direction, i. e., outwardly of the aperture 91.

The movement of the arm 95 just described, is effected automatically by the oscillation of the playing arm 17 as it completes the playing of a record, and as the stylus moves into, for example, an eccentric groove. The oscillatory movement of the playing arm is transmitted through its shaft to the arm 96, which in turn oscillates the arm 95 as just described.

Such oscillation of the arm 95 in swinging the bell crank lever 76 about the pivot 74 against the action of the spring 83, moves the arm 73 out of camming engagement with the cam finger 48, whereby the spring 67 swings the lever 62 about the fulcrum 63 until the clutch member 38 drivingly engages the clutch member 37. Meanwhile, the arm 79 of the bell crank lever 76 has moved toward the position 87 until it has cleared the shoulder 85 and the spring 67 in the clutching action described above has, in conjunction with the spring 83 caused the arm 79 to take the position 87 against the shoulder 85. Now cam 44 is being driven from the clutched pinion cam 36 and the cam shoulder 45 is permitting the turntable 18 to move away from the reproducer 16 or its playing arm 17.

At this point it might be well to mention the function of the peripheral cam surface 49 of the cam 44. When the last described movement of the turntable commences, the cam 44 is in such position that the peripheral cam surface 49 engages a cam surface 99 (Fig. 7) on an arm 101 pivoted as at 102 on the frame member 64 to swing the arm in a counterclockwise direction as viewed in Fig. 7. This arm 101 is connected by a member or link 103 with the arm 96, whereby the latter will be moved in a direction to move the playing arm 17 to a starting position. The other end of the arm 101 is provided with an adjustable set screw 104 adapted to supplement the action of the teeth 98 in rocking the arm 79 when the played record is provided with an eccentric groove at its end and adapted to rock the arm 79 independently of the teeth 98 when the played record is of the type having a circular groove at its end.

An object of the present invention is to provide means for preselecting one or more records from a group of records, and to play the preselected record, or to play a preselected record, and thereafter to play the other preselected records, one at a time. To that end, the record carrying means 19 comprises a plurality of record carriers or trays 105 generally of the ring type, as disclosed in my earlier filed application identified above. Each ring is adapted to carry therein a record 21 and has an internal diameter such that the turntable 18 may pass through the ring to take a record therein and present it for playing. In moving in the opposite direction, the turntable may again pass through the ring, leaving thereon the played record.

Each of the rings 105 has an arm 106 projecting radially from the periphery thereof and having an aperture 107 therein. At one side of the aperture 107 and between it and the ring, a repeating slot 108 is provided in a marginal portion of each arm 106, and is associated with a pair of flat springs 109 provided with rolled ends 111, one such spring being suitably secured to each face of the arm 106 in such a manner that the rolled ends 111 are located adjacent the mouth of the slot 108 and in spaced relation with each other. At the other side of the aperture 107, each arm 106 is provided with a record carrier operating projection or arm 112.

A plurality of such record carriers are assembled on a fixed hollow or tubular member 113 threaded as at 114 in the frame or chassis 24 and providing a common pivot for the record carriers. Each aperture 107 of the arms 106 loosely fits as shown more particularly in Fig. 4, a shank or reduced portion 115 of a spacer 116 arranged on the tubular member 113 under each arm 106 and between adjacent bearing or supporting plates or discs 117. There are two more plates or discs 117 than there are record carriers 105, and those discs alternate with the spacers 116, and in addition, there is one such disc outwardly of each end spacer. The discs 117 are secured against rotation on the tubular member 113 and are adequately supported on the frame or chassis 24 by a pair of studs or bolts 118 passing through each plate at opposite sides of the tubular member 113, and threading, as at 119, into the frame or chassis 24, and by spacers 121 between adjacent plates on each bolt 118.

In that manner a space 122 is provided between adjacent plates or discs 117, whereby to accommodate the arm 106 of each record carrier, and the discs provide ample bearings to support the record carriers intermediate the tubular member 113 and the record carrier rings. The discs 117 are each provided with an arcuate slot 123 for a purpose to be disclosed presently.

Actuating means are provided for cooperation with the operating arms 112 of the record carriers to swing the carriers between the position adjacent the path of the turntable and a position in the path of the turntable. Those two positions may hereafter be referred to as the inactive and active positions, respectively. Such means are shown more particularly in Figs. 3, 4, and 5, and include a rock shaft 124 coaxially arranged in the tubular member 113 and having secured thereon at one end thereof an arm or lever 125 provided at its end removed from the rock shaft with a cam follower 126 adapted to follow in the cam groove 46 of the cam 44, whereby to rock the shaft 124 without rotating the tubular member 113 thereabout.

The rock shaft 124 is provided with a lower arm 127 and an upper arm 128 which are secured thereon to rock therewith by set screws 129 and 131, respectively. Those arms 127 and 128 extend radially outwardly from the shaft 124 beyond the peripheries of the discs 117 and carry in holes 132 and 133 at their respective outer ends, a rockable hollow spindle 134 having a circumferential slot 135 and longitudinal slots 136 and 137 spaced about 90° apart on the periphery of the spindle. The upper arm 128 is provided with a screw 138 (Fig. 10) which extends into the circumferential slot and permits of a limited rocking movement of the spindle 134 about its longitudinal axis. The slot 135 and the screw 138 also cooperate with collars 139 suitably secured on the spindle outwardly of each arm 127 and 128 and with the arms 127 and 128 themselves to hold the spindle in place.

Within the spindle 134 a member 141 is secured to one end of a spring 142, the other end of which is anchored to a pin 143 fixed in the spindle. The member 141 is slidable longitudinally within the spindle and is provided with a finger or pin 144 extending through the longitudinal slot 137 to outside of the spindle, and adapted, when properly actuated, to extend between any two adjacent discs 117 for operatively engaging a record carrier operating projection 112. That member 141 carries a cam roller or follower 145 secured thereto by a screw 146 passing through the roller and the other longitudinal slot 136. Secured to the spindle between the lower arm 127 and the lower ends of the longitudinal slots 136 and 137, is a spindle rocking arm 147 which carries at its end, radially removed from the spindle, a cam follower or roller 148.

With such a construction, the cam follower 145 may be employed to raise the member 141 until the pin 144 registers with a predetermined space 122 between adjacent discs 117. The arm 147 may then be actuated to rock the spindle about its longitudinal axis and in an arcuate aperture 134' in the chassis or frame 24, until the screw 138 and the slot 135 stop such rocking and the pin 144 enters the predetermined space 122. If at this time the cam groove 46 in the cam 44 through the cam follower 126 and the arm 125 turns the rock shaft 124 in a clockwise direction, as seen in Fig. 5, the spindle 134 will be moved in the same direction about the rock shaft by the arms 127 and 128, and will carry with it the pin 144 traveling between the predetermined discs 117. In this movement, the pin 144 will engage the operating arm 112 of the record carrier between the two discs 117 and may drive it in a clockwise direction, whereby to swing the record carrier out to its active position in the path of the turntable.

To return the record carrier to its inactive position in the stack laterally adjacent the path of the turntable, a universal restoring bar 149 is arranged to be rocked in the arcuate slots 123 of the discs 117 by means of a pair of arms 151 and 152. The arm 151 is mounted on the rock shaft 124 above the arm 128 and is held thereon by a retaining plate and screw assembly 153. The arm 152 is mounted on the rock shaft 124 between the arms 125 and 127. The bar 149 extends between the outer ends of the arms 151 and 152 and through the slots 123 in the discs 117 and a hole 154 in the frame 24, and is suitably secured in position by, for example, cotter pins 155 passing through the bar outwardly of the arms 152 and 153. The arms 151 and 152 are yieldably connected to the arms 128 and 127, respectively, by springs 156 and 157 suitably secured as at 158, 159, 161, and 162 to the arms 127, 128, 152, and 153. Thus, when the pin 144 has engaged any operating arm 112 and moved the record carrier to its active position, the restoring bar 149 will return it to its inactive postion when the cam groove 46 reverses the direction of rotation of the shaft 124. During such swinging of the record carriers between their active and inactive positions, the spacers 121 on the studs or bolts 118 provide limiting abutments for the arms 106 of the record carriers.

For operating the arm 147 to rock the spindle 134 about its longitudinal axis, an arcuate member 163 is suitably secured as at 164 on the frame 24 adjacent the arcuate aperture 134', and is provided with an arcuate skirt portion 165 depending into the aperture 134' and with an upstanding arcuate member 166 outwardly adjacent the path of the spindle 134 in swinging about the shaft 124.

The skirt portion 165 is provided with a cam groove 167 having cam depressions or recesses 168 and 169 at its ends. The cam depressions 168, 169 are adapted to cooperate with the cam follower or roller 148 on the arm 147 to rock the spindle about its longitudinal axis at each end of its travel in the arcuate slot 134' about the shaft 124, whereby to swing the pin 144, respectively inwardly into and outwardly from a space 122 between adjacent discs 117. The intermediate portion of the cam groove 167 maintains the spindle and hence the pin 144 in each such position until the follower or roller 148 in traveling with the spindle about the shaft 124, moves into the cam depression 168 or 169, and the direction of rotation of the shaft 124 is reversed by the cam groove 46, whereupon the edge of the cam depression 168 or 169 cams the roller 148 and its supporting arm 147 toward a position lagging the movement of the spindle 135 about the shaft 124.

The arcuate member 163 and its upstanding member 166 provide a cam surface 171 having a dwell portion 172, a rise portion 173, another dwell portion 174, and a relatively abrupt edge 175. When the roller 148 and the cam depression 168 swing the spindle 134 about its longitudinal axis as the cam groove 46 and roller 126 begin to rotate the shaft 124 in a direction to operate the restoring bar 129, that cam surface 171 cooperates with the cam roller 145 to raise the member 141 in the spindle 134 and hence the pin 144. In so raising the member 141, the cam surface and roller are acting against the spring 142, which tends to return the member 141 to its lowermost position.

In other words, the cam surface 171 and the spring 142 are adapted to reciprocate the pin 144 in the longitudinal slot 137 between the end or outer spaces 122. The selecting means 22 is adapted to limit this reciprocatory movement of the pin 144 in one direction and in advance to bring the pin 144 opposite a predetermined space 122, so that through the action of the rock shaft 124 transmitted by the arms 127 and 128 to the spindle 134 and the cam roller 148 and cam depression 169, as well as the action of the cam roller 145 and the cam surface 171, the pin 144 may engage the operating arm 112 in a predetermined space 122 to swing the record carrier to its active position, whereby to select and play a predetermined record.

The selecting means 22 preferably takes the form of a plurality of substantially T-shaped arms or keys 176, each provided with an elongated aperture 177 intermediate its ends, for assembling them on a stud or other suitable mounting means 178 upstanding from the frame 24 adjacent the edge 175 of the arcuate member 166. There is one of these arms 176 for each record carrier 105. They are reciprocable toward and from the discs 117, the aperture 177 about the stud 178 serving as a guide for and to limit such reciprocation. Each arm 176 has a selector portion 179 which when the arm is moved to the position shown in Fig. 5, limits the return of the member 141 by the spring 142 by engaging the roller 145 so that the pin 144 registers with the space 122 wherein is located the operating arm 112 of the record carrier 105 bearing the predetermined record.

A supporting finger 181 of each arm 176 extends into one of the spaces 122 carrying a record carrier operating arm 112, and cooperates with the rolled portions 111 of the springs 109, to restore the arm 176 to the non-selecting position. As the selected record carrier swings to its active position, the rolled portions 111 of the springs 109 engage the end of the corresponding finger 181 in the space 122, and urge the entire arm 176 to the non-selecting position, the elongated aperture 177 about the stud 178 permitting the restoring movement of the arm 176. The springs 109 are yieldable so that the end of the finger 181 may be forced between the rolled portions 111 of the springs and into the slot 108 if after the arm 176 has been restored to its non-selecting position it is desired to select the same record again before or during the actual playing thereof.

As suitable means for operating the arms 176, each arm is provided with an operating key or portion 183 extending from the selecting portion 179 in a direction opposite to that in which the finger 181 extends from the selector portion. If desired, these keys 183 may extend through slots 184 in a selector panel 185 suitably secured to the frame 24, and may be provided with manually operated buttons 186 bearing thereon suitable indicia 187 to indicate the records corresponding to the keys.

As already mentioned, there is one more space 122 than there are record carriers. The purpose of this extra space is to provide means capable of automatically selecting all the records for playing them in rotation. Such a means comprises an operating arm 188 similar to the arms 112 and pivoted on the tubular member 113 at the enlarged portion 189 of the arm. This enlarged portion 189 has at the side of the tubular member 113 opposite the arm 188, a shoulder or projection 191 which is moved to the position shown in Fig. 6 by the pin 144 when no manual selection has been made. At that position the projection 191 by virtue of the cam action of the enlarged portion 189 engages a hook or slot 192 at the end of an arm 193 pivoted on a member 194 and urged toward the engaging position by a spring 195 mounted on the frame 24. The member 194 extends through an elongated aperture 196 in each arm 176 and is supported by spaced arms 197 of a vertically arranged yoke 198, the member 194 being held in apertures through the corresponding ends of the spaced arms 197 by any suitable means 199. That vertically arranged yoke 198 is pivoted intermediate the ends of the arms 197 on a bar or pivot member 201 upstanding from the frame 24 and secured thereto in any suitable manner.

When the cam depression 168 and its follower swing the spindle 134 to cause the pin 144 to disengage the operating arm 188, the restoring bar 149 reverses the movement of the operating arm 188 and swings it in a counterclockwise direction as seen in Fig. 6. This latter movement of the operating arm 188 is transmitted to the arm 193 through the engagement of the shoulder 191 and hook 192, thereby swinging the member 194 and the pivoted yoke 198 in a clockwise direction about the pivot bar 201. The member 194 during such movement, engages the inner ends of the aperture 196 in each arm 176 to move all of the arms forwardly to the selecting position.

As the first record carrier is swung to its active position by the pin 144 which enters the first space 122 because of the engagement of the cam roller 145 with the selecting portion 179 of the first arm 176, the rolled ends 111 of the springs 109 engage the end of that finger 181 in the first space, and thereby move the arm 176 to a non-selecting position. Now the next selecting portion 179 of the next arm 176 will be effective to limit the reciprocation of the pin 144 by the spring 142, whereby the next record carrier will be moved to its active position after the restoring bar 149 has returned the first selected record carrier bearing the played record, to its inactive position. This cycle will thus be repeated until all of the succeeding carriers have been moved in succession to their respective active positions and returned to their inactive positions. In each case the corresponding arm 176 will be moved to its non-selecting position.

In order to cancel a selection after it has been made, a button 202 on the panel 185 is connected to a bar 203 which engages the end of one of the arms 197 at the side of the yoke pivot 201 opposite the member 194. Pressing the button 202 causes the arms 197 to swing in a counterclockwise direction, as viewed in Fig. 5, and causes the member 194 to engage the forward ends of the aperture or apertures 196 of any arm or arms 176 which may be in a selecting position, and to move the arm or arms to the non-selecting position. The next selection will, of course, restore that cancellation button 202 to its original position.

In operation, one or more buttons 186 may be selected at the will of the operator, who then deposits in the coin operated mechanism 26 a number of coins equal to the number of buttons selected. The button or buttons may be operated to selecting position before or after the coin or coins are deposited in the mechanism 26. The construction and operation of the coin operated mechanism 26 are such that for each coin deposited therein the motor 27 operates the gears 33 and 34, the shaft 35, and through the clutch members 37 and 38, the gears 36 and 39, to operate the gear 43 and to drive the shaft 42 and hence the cam 44 one complete revolution. During such operation, the motor 27 being directly coupled to the shaft 29 and the telescoping sleeve 31, is rotating the turntable.

The rotation of the cam 44, through the action of the cam projection 45, the roller 51, and links 52, 54, and 55, causes the turntable to move away from the playing arm 17 and to take with it the last played record. The turntable moves downwardly through the ring shaped record carrier 105 which has been held in its active position during the playing of the record by the pin 144 engaging the operating arm 112 in the space 122. As the turntable moves through the ring shaped carrier, it deposits therein the played record and continues its movement to the position below the lowest record carrier 105 in the stack.

Meanwhile, after the record has been deposited in the tray or record carrier and the turntable has passed therethrough, the cam groove 46 and its associated roller are rocking the shaft 124 in a counterclockwise direction, as seen in Fig. 5, causing the cam depression 168, through its associated roller, to disengage the pin 144 from the operating arm 112 of the record carrier 112 which is still in the active position. Now the restoring bar 149 engages the operating arm 112, and in swinging about the shaft 124 restores the record carrier and the played record therein to the stack or inactive position.

During such restoring operation, the cam roller 145 is following the cam surface 171, whereby the pin 144 is raised against the action of the spring in the spindle 134. Continuing its movement along the cam surface 171, the roller passes beyond the edge 175 and is pulled down by the spring in the spindle 134 until it reaches the selecting member or portion 179 of the first arm 176 operated by the button 186.

The cam groove 46 now reverses the rotation of the rock shaft 124, whereupon the cam depression 169 and its associated roller rock the spindle 134 about its longitudinal axis, whereby to swing the pin 144 into the space 122 carrying the operating arm 112 of the record carrier 105 bearing the first selected record. This pin then engages the operating arm 112 in that space 122 and swings it in a clockwise direction, as viewed in Fig. 5, whereby to swing the record carrier to its active position over the turntable.

Now the cam projection 45 and the cam follower 51 through the associated links move the turntable up through the positioned ring, taking therefrom the selected record and presenting it for playing by the reproducer 16. As the turntable with the selected record arrives in a playing position, the cam finger 48 depresses the arm 73. This movement is transmitted to the pivoted arm or lever 62 through the pin 74 and swings the arm 62 and the attached clutch member 38 to a declutched position, whereby to stop the rotation of the cam 44.

As the tone arm plays the selected record, the lug 32 on the gear 34 cams the arm 78 of the bell crank lever 76 in a counterclockwise direction about the pivot bolt 77 of the bell crank lever, whereby to raise the arm 79 until it clears the shoulder 85, whereupon the spring 83 moves the arm to the position 88 against the shoulder 86. Now when the playing reaches the end of the record, whether it be of the eccentric or circular finish groove type, the arm 79 is operated about the pin 74, pivoting the attached arm 73 in the socket 72, by the teeth 98 and/or the set screw 104 to cause the cam surface 75 to disengage the cam finger 48.

When the cam surface 75 disengages the cam finger 48, the spring 67 swings the lever 62 and the attached clutch member 38 about the pivot bolt 63 to clutch the gear 36 and the shaft 35 in driving relationship, thus starting the cam 44 to rotate again. At this time the peripheral cam surface 49 of that cam 44 engages the cam surface 99 and swings the arm 101 about its pivot 102. This movement is transmitted to the playing arm shaft to return it to its starting position by the link 103 connecting the arm 101 with the arm 96 fixed on the playing arm shaft. The foregoing cycle may be repeated for each coin deposited in the coin operated mechanism.

While I have described a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In an automatic phonograph, a record changer comprising a shaft for controlling the changing of records, means for rotating said shaft, means reciprocable longitudinally of said shaft and rotatable therewith for selecting and changing records, and means for reciprocating the last said means, including a cam follower connected to the reciprocable means, and a cam engageable by said cam follower while said reciprocable means is rotating with said shaft.

2. In an automatic phonograph, a plurality of pivotally mounted substantially vertically aligned record carriers, a turntable, vertically adjustable means hinged to swing about the pivotal axis of the carriers, and adjustable to a plurality of elevations to engage any of said record carriers, automatically operable means for moving the last said means to swing a record carrier to a position above the turntable, and a restoring member hinged to swing about the pivotal axis of the carriers for returning the record carriers to normal position.

3. In an automatic phonograph having a plurality of record carriers and means for playing the records in selected record carriers, selector means movable to selecting positions respectively adjacent the record carriers and movable from any said selecting position to engage with the adjacent record carrier, means for successively moving said selector means to a series of selecting positions always beginning with an end selecting position of the series and progressing toward the other end of said series of selecting positions until said selecter means is moved to all of said selecting positions in said series whereby to select a plurality of records in a predetermined sequence, and means for moving said selector means from each said selecting position to engage with the adjacent record carrier.

4. In an automatic phonograph, a plurality of movable record-carriers, a turntable, a plurality of selector bars for simultaneously selecting the records to be played, an actuating element adjustable to a plurality of positions to engage each of said record carriers, a guide member including an inclined cam face terminating at and above said selector bars and over which said actuating element is movable and from which it is adapted to drop onto a given selector bar to bring it into position for selecting a given carrier, and means for moving said actuating element to move the carrier to a position over the turntable.

5. In an automatic phonograph, a turntable, a plurality of superposed record-carriers movable to and from a position over the turntable, a plurality of projectable selector bars for simultaneously selecting a plurality of records to be played, an elevating guide member, said selector bars, when projected, having portions in cooperative relation with said guide member to constitute a continuation thereof, a movable carrier actuating element engageable with said elevating guide member and with said projected bar-portions for bringing said element into registering engagement with said carriers to successively move them with the records selected to a position over the turntable, means for moving said carrier actuating element in one direction over the elevating guide member and in the opposite direction to move the carriers to an operative position over the turntable, and means associated with the actuating element moving means adapted for operative engagement with a selected carrier to move it from an operative position over the turntable simultaneously with the movement of said element in a direction over its elevating guide member.

6. In an automatic phonograph, a turntable, a substantially upright shaft, a plurality of record-carriers on said shaft to swing about the same into and out of a position over the turntable, a combined rotatable and vertically movable selective element disposed about the shaft for engaging each of said record carriers to select the record to be played, a plurality of selector bars for simultaneously selecting a plurality of records to be played, said bars corresponding in number to and at substantially the same elevations as the respective record carriers, means for rotating said selective element in a direction to present it into registration with a selected carrier, means for guiding said element vertically to bring it into operative relation with the bars selected, the latter governing the elevation of the selective element to a position for operative engagement with the corresponding record-carrier, and means for returning the carrier selected to its initial position after its record has been played.

7. In an automatic phonograph, a plurality of superposed, movable record carriers, projectable selector elements disposed one above another and corresponding in number to the respective carriers, and movable means adjustable to a plurality of elevations in line with and adapted to engage each of said carriers to select the records to be played, said selector elements, when projected, being in the path of and directly controlling the position of said movable means to a given elevation to select the companion record for play.

8. A phonograph comprising reproducing means swingable between a starting position and a position centrally of a record being played for playing the same; record changing means including a reciprocable turntable for moving a record from a non-playing position to and from record playing relationship with said record reproducing means, and record supporting and delivery means for supporting a plurality of records in a storage position laterally spaced from the path of said turntable, for delivering a record to be played from said storage position to said non-playing position, and for removing the played record from said non-playing position and returning it to said storage position; record selecting means including operating means therefor for selecting records for delivery by said record delivery means to said non-playing position; manual means for controlling said selecting means to cause it to select one or more records for playing one at a time; other means for controlling said selecting means to cause it to select a plurality of records one at a time; means on said selecting means for operating said other means when no selection is made by said manual means whereby a plurality of records are selected for playing one at a time; manually operable control means for starting the phonograph; and means swingable with said record reproducing means for causing the actuation of said record changing means when said record reproducing means completes the playing of a selected record to return the played record to its storage position.

9. A phonograph comprising record reproducing means swingable between a starting position and a position centrally of a record being played for playing the same; record changing means including a turntable and record supporting and delivery means adapted to support a plurality of records laterally spaced from said turntable and movable to cooperate with said turntable to deliver a record to be played from said position laterally of said turntable to and from record playing relationship with said record reproducing means; record selecting means including operating means therefor for selecting records for changing by said record changing means; manual means for controlling said selecting means to cause it to select one or more records for playing one at a time; other means for controlling said selecting means to cause it to select a plurality of records for playing one at a time; and means on said selecting means for operating said other means when no selection is made by said manual means whereby a plurality of records are selected for playing one at a time.

10. A phonograph comprising record reproducing means swingable between a starting position and a position centrally of a record being played for playing the same; a turntable; record supporting and delivery means for supporting a plurality of records laterally spaced from said turntable, and for cooperating with said turntable to deliver a record to be played from said position laterally spaced from said turntable to and from record playing relationship with said record reproducing means; record selecting means including operating means therefor for selecting records for delivery to and from record playing relationship with said record reproducing means; manual means for controlling said selecting means to cause it to select one or more records for playing one at a time; manually operable control means for starting the phonograph; means swingable with said record reproducing means for causing the actuation of said record delivery means when the playing of a selected record is completed to return the played record to its position laterally spaced from said turntable; and means for automatically actuating the selector operating means when no selection is made by said manual means upon the operation of said manually operable control means to cause said selector to select a predetermined record for playing.

11. A phonograph comprising record reproducing means swingable between a starting position and a position centrally of a record being played for playing the same; record changing means including a reciprocable turntable for moving a record from a non-playing position to and from record playing relationship with said record reproducing means, and record delivery means for delivering a record to be played from a storage position laterally of the path of said turntable to said non-playing position and for removing the played record from said non-playing position and returning it to said storage position; record selecting means including operating means therefor for selecting records for delivery by said record delivery means to said no-playing position; manual means for controlling said selecting means to cause it to select one or more records for playing one at a time; other means for controlling said selecting means to cause it to select a plurality of records for playing one at a time; means on said selecting means for operating said other means when no selection is made by said manual means, whereby a plurality of records are selected for playing one at a time; manually operable control means for starting the phonograph; means swingable with said record reproducing means for causing the actuation of said record changing means when it completes the playing of a selected record to return the played record to said storage position; and selection cancelling means for canceling the selections caused by the manual selector control means and by said other means.

12. A phonograph comprising record reproducing means swingable between a starting position and a position centrally of a record being played for playing the same; record changing means including a reciprocable turntable for moving a record from a non-playing position to and from record playing relationship with said record reproducing means, and record delivery means for delivering a record to be played from a storage position laterally of the path of said turntable to said non-playing position and for removing the played record from said non-playing position and returning it to said storage position; record selecting means including operating means therefor for selecting records for delivery by said record delivery means to said non-playing position; manual means for controlling said selecting means to cause it to select one or more records for playing one at a time; manually operable control means for starting the phonograph; means swingable with said record reproducing means for causing the actuation of said record changing means when it completes the playing of a selected record to return the played record to said storage position; selection canceling means for canceling the selections caused by the manual selector control means; and means for automatically operating said selector control means when all selections have been canceled by said canceling means and said manually operable control means is operated to cause said selector to select a predetermined record for playing.

13. A phonograph comprising record reproducing means swingable between a starting position and a position centrally of a record being played for playing the same; record changing means including a reciprocable turntable for moving a record from a non-playing position to and from record playing relationship with said record reproducing means, and record delivery means for delivering a record to be played from a storage position laterally of the path of said turntable to said non-playing position and for removing the played record from said non-playing position and returning it to said storage position; record selecting means including operating means therefor for selecting records for delivery by said record delivery means to said non-playing position; manual means for controlling said selecting means to cause it to select one or more records for playing one at a time; manually operable control means for starting the phonograph; means swingable with said record reproducing means for causing the actuation of said record changing means when it completes the playing of a selected record to return the played record to said storage means; selection canceling means for canceling the selections caused by the manual selector controlling means; and means for automatically operating said selector control means when all selections have been canceled by said canceling means and said manually operable control means is operated to select a predetermined plurality of records for playing one at a time.

14. In an automatic phonograph, a record reproducer, a series of independently movable record carriers, a turntable laterally spaced from the series of record carriers and reciprocable between a position outwardly beyond one end of the series of record carriers and a position of playing relationship with said reproducer outwardly beyond the other end of said series of record carriers, manually actuatable means for predetermining for play a plurality of records in said series of record carriers, the predetermining means being adapted to predetermine records both in consecutive record carriers and in non-consecutive record carriers in said series, means governed in part by said predetermining means for selecting the consecutive and non-consecutive record carriers with the predetermined records one at a time in successive order always beginning with the record carrier bearing the predetermined record nearest one end of said series of record carriers and progressing toward the other end of said series of record carriers until all of the record carriers with the predetermined records are selected, means for moving each record carrier as it is selected into the path of the turntable, and means for moving the turntable to playing relationship with said reproducer when each selected record carrier is moved into the path of the turntable to remove the record from the selected record carrier and to move the record into playing position, and, after playing of the record, for moving the turntable out of playing relationship with said reproducer to replace the played record in its record carrier.

15. In an automatic phonograph, a record reproducer, a plurality of independently movable record carriers arranged normally during non-playing in stack relationship, a turntable laterally spaced from the stack of record carriers and reciprocable between a level below the lowermost record carrier and a position of playing relationship with said reproducer at a level above the uppermost record carrier in the stack, means for predetermining for play a plurality of records in said stack of record carriers, the predetermining means being adapted to predetermine records in non-consecutive record carriers, means governed in part by said predetermining means for selecting the non-consecutive record carriers with the predetermined records one at a time in successive order always beginning with the record carrier bearing the predetermined record nearest one end of said stack and progressing toward the other end of said stack until all of the non-consecutive record carriers with the predetermined records are selected, means for moving each non-consecutive record carrier as it is selected into the path of the turntable, and means for moving the turntable to playing relationship with said record reproducer when each selected record carrier is moved into the path of the turntable to remove the record from the selected record carrier and to move the record into playing position, and, after playing of the record, for moving the turntable out of playing relationship with said reproducer to replace the played record in its record carrier.

16. In an automatic phonograph, a record reproducer, a turntable reciprocable to and from playing relationship with said reproducer, a plurality of independently movable record carriers normally arranged during non-playing in stack relationship at one side of the path of movement of said turntable, means for moving said record carriers one at a time from the stack of record carriers into the path of said reciprocable turntable and for returning them therefrom back into said stack of record carriers, means for moving said turntable to and from playing relationship with said reproducer while each said record carrier is in the path of said turntable to remove the record from the record carrier and to move the record into playing relationship with said reproducer and after playing to return the record to said record carrier, manually actuatable means for predetermining for play a plurality of records in non-consecutive record carriers in said stack of record carriers, and means governed in part by the predetermining means for selecting the non-consecutive record carriers with the predetermined records one at a time in a predetermined order, always the same, until all of the non-consecutive record carriers with the predetermined records are selected for successive movement by the record carrier moving means into and from the path of said reciprocable turntable.

17. In an automatic phonograph, a turntable, a tone arm, a plurality of record carriers movable to and from a position over the turntable, manually operable means for predetermining a plurality of records to be played, means governed in part by the predetermining means for successively selecting and moving the predetermined record carriers to a position above the turntable, means for raising said turntable after each record carrier is moved to a position above said turntable to lift the records from the carriers into playing engagement with the tone arm, an intermittently driven shaft having a master cam thereon operatively connected to said second and third named means for actuating them in predetermined sequence, means controlled by the tone arm for governing the rotation of said master cam, and a tone arm actuating member including a connection for operative engagement with the master cam for effecting the return of the tone arm from the end of its playing position to the beginning of its playing position.

18. In an automatic phonograph, a plurality of movable record carriers, a turntable, a plurality of selector bars for predetermining each of a plurality of records to be played, an actuating element movable to a plurality of positions one for each of said record carriers to engage the same, a stationary cam guide member operatively associated with said selector bars, the latter and said guide member cooperating to position said actuating element for selecting a given carrier, and means for moving said actuating element to move the carrier to a position over the turntable.

19. In an automatic phonograph, a plurality of movable record carriers, a turntable, manually operable means including a plurality of members corresponding in number to the respective carriers for predetermining the records to be played, adjustable selective means operable at a plurality of elevations, one for each record carrier, for engaging the same to select the records to be played, said members being disposed in the path of movement of said selective means to position the same in operative relation with the carrier bearing a predetermined record, and means for moving said selective means to move the record carrier selected to a position above the turntable.

20. In an automatic phonograph, a turntable, a tone arm, a plurality of record carriers movable to and from a position over the turntable, a plurality of selector members one for each said record carrier and at respectively corresponding positions as the respective carriers, an adjustable selective element movable to a plurality of positions one for each said record carrier for engaging the same to select the records to be played, said selector members being disposed in the path of movement of said selective element to position the same in operative relation to the predetermined carrier, means for rotating said selective element to move the record carrier selected to a position above the turntable, means for raising said turntable to lift the records from the carriers into playing engagement with the tone arm, and a master cam for controlling said selective element, rotating means, and said turntable raising means.

21. In an automatic phonograph, a plurality of superposed movable record carriers, projectable selector bars corresponding in number to and at substantially the same elevation as the respective carriers, and movable means adjustable to a plurality of elevations in line with and adapted to engage each of said carriers to select the records to be played, said selector bars when projected controlling and directly governing the position of said movable means to a given elevation.

22. In an automatic phonograph, a turntable, a tone arm, a plurality of record carriers movable to and from a position over the turntable, a plurality of selector bars corresponding in number to and at substantially the same elevation as the respective carriers, a selective element adjustable to a plurality of elevations in line with and adapted to engage each of said carriers, said selector bars controlling and directly governing the position of said selective element to a given elevation, means for rotating said selective element to move the record carriers selected to a position above the turntable, means for raising said turntable to lift the records from the carriers into playing engagement with the tone arm and for lowering the turntable to deposit the record on its carrier, means for returning the tone arm from the end of its playing position to the beginning of its playing position, and a master cam for initiating and governing the said means for rotating the selective element, for raising and lowering the turntable, and for returning the tone arm.

23. In an automatic phonograph, a turntable, a tone arm, a plurality of record carriers movable to and from a position over the turntable, a plurality of selector bars corresponding in number to and at substantially the same elevation as the respective carriers, a selective element adjustable to a plurality of elevations in line with and adapted to engage each of said carriers, said selector bars having portions in the path of movement of and directly controlling the position of said selective element to a given elevation, means for rotating said selective element to move the record carrier selected to a position above the turntable, means for raising said turntable to lift the records from the carriers into playing engagement with the tone arm and for lowering the turntable to deposit the record on its carrier, means for returning the tone arm from the end of its playing position to the beginning of its playing position, a master cam for initiating and governing the said means for rotating the selective element, for raising and lowering the turntable, and for returning the tone arm, means for driving said cam, a clutch for controlling the driving of said cam, and means for effecting the engagement of the clutch at a predetermined time in the playing of the record to rotate the cam, the latter at a predetermined time in its movement governing the release of the clutch.

24. In an automatic phonograph, a turntable, a plurality of superposed record carriers movable to and from a position over the turntable, means for predetermining a plurality of records to be played, a movable frame including a vertically adjustable actuating element movable to a registering position for operative engagement with said carriers to successively move them with the predetermined records to a position over the turntable, means for moving said frame, means for controlling the adjustable movement of said actuating element in one direction to a registering position in accordance with the predetermined records, the predetermining means predetermining the adjustable movement of the actuating element in the opposite direction and constituting a part of said controlling means, and means on said movable frame for returning the record carriers from their position over the turntable.

25. In an automatic phonograph, a turntable, a plurality of superposed record carriers movable to and from a position over the turntable, a plurality of projectable selector bars for predetermining each of a plurality of records to be played, an elevating guide member, said selector bars, when projected, having portions in cooperative relation with said guide member to constitute a continuation thereof, a movable carrier actuating element engageable with said elevating guide member and with said projected bar portions for bringing said element into registering engagement with said carriers to successively move them with the predetermined records to a position over the turntable, and means for moving said carrier actuating element in one direction over the elevating guide member and in the opposite direction to move the carriers to an operative position over the turntable.

26. In an automatic phonograph, a turntable, a plurality of record carriers pivoted to swing about a common fulcrum to and from a position over the turntable, means for predetermining a plurality of records to be played, and an oscillatory frame fulcrumed to swing about the pivot of said carriers and having independent, vertically adjustable means thereon governed in part by the predetermining means for selecting each predetermined carrier and swinging it to a position over the turntable and a second means thereon for returning that carrier to its initial position after its record has been played.

27. In an automatic phonograph, a turntable, a plurality of record carriers pivoted to swing about a common fulcrum to and from a position over the turntable, means for predetermining a plurality of records to be played, an oscillatory frame fulcrumed to swing about the pivot of said carriers and having independent, vertically adjustable means thereon for selecting each predetermined carrier and swinging it to a position over the turntable and a second means thereon for returning that carrier to its initial position after its record has been played, the predetermining means having operable portions thereon for the registration of said adjustable means on the oscillatory frame with the respective carriers to successively select them with the predetermined records for movement to a position over the turntable, and means for actuating said oscillatory frame.

28. In an automatic phonograph, a turntable, a plurality of record carriers pivoted to swing about a common fulcrum to and from a position over the turntable, means for predetermining a plurality of records to be played, an oscillatory frame fulcrumed to swing about the pivot of said carriers and having an actuating element mounted thereon for operative engagement with said carriers to successively move them with the predetermined records to a position over the turntable, said element being slidably and rotatably mounted on said frame to bring it into and out of positions for actuating the carriers with the predetermined records, an elevating guide member disposed in cooperative relation with the predetermining means and over which said actuating element is adapted to travel to move it vertically and present it for registration with a predetermined carrier, the predetermining means determining the elevation of the actuating element to a given carrier, and means for rotating said actuating element at predetermined times to bring it into engagement with said elevating guide member and into operative engagement with the record carriers, respectively, to swing them successively to a position over the turntable.

29. In an automatic phonograph, a turntable, a plurality of record carriers pivoted to swing about a common fulcrum to and from a position over the turntable, means for predetermining a plurality of records to be played, an oscillatory frame fulcrumed to swing about the pivot of said carriers and having an actuating element mounted thereon including a part for operative engagement with said carriers to successively move them with the predetermined records to a position over the turntable, said element being slidably and rotatably mounted on said frame to assume different radial and elevated positions thereon, an elevating guide member disposed in cooperative relation with the predetermining means, the latter forming a continuation thereof in their predetermining position, said actuating element having a part thereon engageable with said guide member for moving the actuating element vertically and to present its carrier-engaging part for registration with a predetermined carrier, the predetermining means determining the elevation of the actuating element to such carrier, means for actuating the oscillatory frame, and means adjacent the ends of its oscillating strokes for rotating said actuating element to at one time bring its guide member engaging part into operation for elevating the actuating element and at another time bring its carrier-engaging part into operation for swinging a carrier to a position over the turntable.

30. In an automatic phonograph, a turntable, a substantially upright shaft, a plurality of record carriers on said shaft to swing about the same into and out of a position over the turntable, a rotatable and vertically movable selective element disposed to swing about the shaft for engaging each of said record carriers to select the record to be played, means for predetermining a plurality of records to be played, said predetermining means including portions in the path of and governing the movement of said selective element to a predetermined position to register with a predetermined carrier, and means for rotating said selective element to swing the predetermined carrier to a position over the turntable.

31. In an automatic phonograph, a turntable, a substantially upright shaft, a plurality of record carriers on said shaft to swing about the same into and out of a position over the turntable, a rotatable and vertically movable selective element disposed to swing about the shaft for engaging each of said record carriers to select the record to be played, a plurality of selector bars for predetermining a plurality of records to be played, said bars corresponding in number to and being at substantially the same elevation as the respective record carriers, means for rotating said selective element in a direction to present it into registration with a predetermined carrier, and means for guiding said element vertically to bring it into operative relation with the predetermined bars, the latter governing the elevation of the selective element to a position for operative engagement with the corresponding record carrier.

32. In an automatic phonograph, a plurality of superposed movable record carriers, a turntable, means including a plurality of manually projectable selector bars for predetermining a plurality of records to be played and means governed in part by said selector bars, when projected, for automatically moving said record carriers with the predetermined records to a position above said turntable, said carriers having portions therein engageable with said selector bars for automatically returning them to their normal retracted position during movement of the carriers to an operative position over the turntable.

33. In an automatic phonograph, a plurality of superposed movable record carriers, a turntable, means including a plurality of manually projectable selector bars for predetermining a plurality of records to be played, means governed in part by said selector bars, when projected, for automatically moving said record carriers with the predetermined records to a position above said turntable, said carriers having portions thereon engageable with said selector bars for automatically returning them to their normal retracted position during movement of the carriers to an operative position over the turntable, means for moving said carriers to normal position in superposed relation, and means operatively connected to the several selector bars for automatically and simultaneously projecting them to the predetermined position.

34. In an automatic phonograph, a plurality of superposed movable record carriers, a turntable, means including a plurality of manually projectable selector bars for predetermining a plurality of records to be played, means governed in part by said selector bars, when projected, for automatically moving said record carriers with the predetermined records to a position above said turntable, said carriers having portions thereon engageable with said selector bars for automatically returning them to their normal retracted position during movement of the carriers to an opertive position over the turntable, the selector bars having aligned slots therein, a laterally movable rod extending through said slots, and means for actuating said rod in a direction to couple the selector bars as a unit to project them collectively to predetermining position, said bar slots being of a length to permit normal independent movement of the bars relative to the rod.

35. In an automatic phonograph, a plurality of superposed movable record carriers, a turntable, means including a plurality of manually projectable selector bars for predetermining a plurality of records to be played, means governed in part by said selector bars, when projected, for automatically moving said record carriers with the predetermined records to a position above said turntable, means for returning each carrier to initial position after its record has been played, said carriers having portions thereon engageable with said selector bars for automatically returning them to their normal retracted position during movement of the carriers to an operative position over the turntable, the selector bars having aligned slots therein, a laterally movable rod extending through said slots, means for actuating said rod in a direction to couple the selector bars as a unit to project them collectively to a predetermining position, said bar slots being of a length to permit normal independent movement of the bars relative to the rod, said rod-actuating means consisting of a rotatable member engageable by the record carrier returning means to be turned thereby during its record carrier returning movement and having a tooth thereon, and a lever pivoted to said slot engaging rod and provided at its free end with a notch for releasably receiving the tooth of said rotatable member.

36. In an automatic phonograph, a turntable, a plurality of record carriers, means for predetermining a plurality of records to be played, means governed in part by the predetermining means for successively moving said record carriers with the predetermined records to a position above the turntable, a driving shaft, a cam driven thereby and operatively connected to said carrier moving means for actuating it, a clutch interposed between said shaft and said cam and including an actuating lever therefor normally urging the clutch to an engaged position to move a predetermined carrier to an operative position, releasable cam-controlled means for holding said clutch in a released position after selection and during playing of a predetermined record, and means for disengaging said cam-controlled means to effect the automatic engagement of the clutch upon the completion of playing of a record.

37. In an automatic phonograph, a turntable, a plurality of record carriers, means for predetermining a plurality of records to be played, means governed in part by said predetermining means for successively moving said record carriers with the predetermined records to a position above the turntable, a driving shaft, a cam driven thereby and operatively connected to said carrier-moving means for actuating it, a clutch interposed between said shaft and said cam and including an actuating lever therefor normally urging the clutch to an engaged position to move a predetermined carrier to an operative position, releasable cam-controlled means for holding said clutch in a released position after selection and during playing of a predetermined record, a trip lever applied to said releasable cam-controlled means, a tappet movable with the driving shaft, and means rendered operative upon the completion of playing a record for shifting the trip lever into the path of said tappet, the latter through said lever disengaging said cam-controlled means to effect the automatic engagement of the clutch.

38. In an automatic phonograph, a turntable, a tone arm, a plurality of record carriers movable to and from a position over the turntable, means including a cam member for controlling the movement of said carriers, a driving shaft including a tappet rotatable therewith, a clutch interposed between said shaft and said cam member, a lever for the clutch including a spring for urging said clutch to an engaged position, and means for automatically controlling said clutch comprising a laterally displaceable trip bar fulcrumed on said lever, a part on said cam member engageable with said trip bar for normally holding the clutch lever in its released position, a trip lever pivoted to said trip bar having an arm adapted to be engaged, when in its tripped position, by said shaft-tappet for displacing the trip bar from said cam-part to engage the clutch, means for normally supporting the trip lever clear of the shaft-tappet, and an operative connection between the tone arm and the trip lever for disengaging the latter from its supporting means at the completion of playing of a record and affecting its displacement to bring the trip-arm thereof into the path of the shaft-tappet.

39. In an automatic phonograph, a turntable, a tone arm, a plurality of record carriers movable to and from a position over the turntable, and means for effecting the automatic return of the tone arm to its initial position upon the completion of playing a record, comprising a cam, a connection between said cam and the record carriers for actuating the latter, means for controlling the rotation of said cam, a rock lever disposed in edgewise relation to and actuated in one direction by the cam and having one of its arms disposed for engagement with the cam when the tone arm is at the end of its playing position, and a link connecting the other arm of said lever with the tone arm.

40. In an automatic phonograph, a plurality of movable record carriers, selector members for predetermining a plurality of records to be played, and movable means adjustable to a plurality of positions, determined by the selector members to engage each of said record carriers comprising an oscillatory, upright tubular support, a plunger movable axially thereof to varying elevations and free to rotate therein between certain limits, a record engaging element mounted on said plunger, a stationary elevating cam adjoining the selector members and with which said roller is adapted to engage for lifting the plunger to a position above said selector members, said cam terminating short of said selector members and the plunger being adapted to drop by gravity from the cam onto a projected selector member, means for turning said plunger in its support to, at predetermined times, bring the lifting roller thereof into engagement with the elevating cam and the record engaging element into operative relation to the carrier, and means for actuating said support in opposite directions relative to the cam.

41. In an automatic phonograph, a plurality of of superposed movable record carriers, a turntable, means including a plurality of manually projectable selector bars for predetermining a plurality of records to be played, said bars being disposed at elevations substantially corresponding to those of the carriers, and means adjustable to varying elevations and directly controlled to a given elevation by said selector bars, when projected, for automatically moving said carriers with the predetermined records to a position above said turntable.

42. In an automatic phonograph, a plurality of superposed movable record carriers, a turntable, means including a plurality of manually projectable selector bars for predetermining a plurality of records to be played, said bars being disposed at elevations substantially corresponding to those of the carriers, an actuating element registrable with a projected selector bar and engageable with a companion carrier for moving it to a position over the turntable, means for transmitting motion to said actuating element, and means for guiding such element into registration with a projected selector bar.

43. In an automatic phonograph, a plurality of superpose movable record carriers, a turntable, means including a plurality of manually projectable selector bars for predetermining a plurality of records to be played, means governed in part by said selector bars, when projected, for automatically moving said record carriers with the predetermined records to a position above said turntable, said carriers having portions thereon engageable with said selector bars for automatically returning them to their normal retracted position upon movement of the carriers to an operative position over the turntable, and means operatively connected to said selector bars for manually returning any projected bar or bars to a retracted position.

44. In an automatic phonograph, a turntable, a plurality of record carriers pivoted to swing to and from a position over the turntable, means for predetermining a record or records to be played, and an oscillatory member fulcrumed to swing in substantially the plane of movement of said carriers and having means thereon governed in part by the record predetermining means for swinging a predetermined carrier to a position over the turntable and a second means thereon for returning that carrier to its initial position after the record has been played.

45. In an automatic phonograph, a plurality of superposed movable record carriers, a turntable, means including a plurality of projectable selector bar for predetermining any record or records desired to be played, and means governed in part by said selector bars, when projected, for automatically moving said record carriers with the predetermined records to a position in operative relation to the turntable, said carriers having portions thereon engageable with the companion selector bars for automatically returning them to their normal retracted position during movement of the carriers into operative relation to the turntable.

PAUL H. SMYTH, Jr.

CERTIFICATE OF CORRECTION.

Patent No. 2,159,832. May 23, 1939.

PAUL H. SMYTH, JR.

It is hereby certified that error appears in the printed specification of the above numbered patent requiring correction as follows: Page 4, second column, line 26, for the reference numeral "135" read 134; page 6, first column, line 34, for "lug 32" read lug 82; same page, second column, line 29, claim 3, for "selecter" read selector; page 7, second column, line 59, claim 11, for "no-playing" read non-playing; page 11, first column, line 44, claim 33, for the word "predetermined" read predetermining; line 57, claim 34, for "opertive" read operative; page 12, first column, line 50, claim 41, strike out the word "of"; same page, second column, line 18, claim 43, for "superpose" read superposed; line 48, claim 45, for "bar" read bars; and that the said Letters Patent should be read with this correction therein that the same may conform to the record of the case in the Patent Office.

Signed and sealed this 22nd day of August, A. D. 1939.

(Seal)

Leslie Frazer
Acting Commissioner of Patents.